United States Patent [19]

Kostic

[11] Patent Number: 5,448,590
[45] Date of Patent: Sep. 5, 1995

[54] EQUALIZATION TECHNIQUE FOR COMPENSATING FOR DEGRADATION TO THE TRANSMISSION OF DIGITALLY MODULATED SIGNALS

[75] Inventor: Zoran Kostic, Tinton Falls, N.J.

[73] Assignee: AT&T Corp., Murray Hill, N.J.

[21] Appl. No.: 35,860

[22] Filed: Mar. 23, 1993

[51] Int. Cl.6 .................................... H03H 7/30
[52] U.S. Cl. .......................... 375/232; 364/724.2; 375/229
[58] Field of Search .................. 375/11, 14; 364/724.2; 333/28 R

[56] References Cited

U.S. PATENT DOCUMENTS

| | | | |
|---|---|---|---|
| 5,097,482 | 3/1992 | Serizawa et al. | 375/12 |
| 5,119,401 | 6/1992 | Tsujimoto | 375/14 |
| 5,157,690 | 10/1992 | Buttle | 375/14 |
| 5,164,727 | 11/1992 | Zakhor et al. | 341/143 |
| 5,175,747 | 12/1992 | Murakami | 375/14 |
| 5,237,588 | 8/1993 | Tanaka et al. | 375/11 |
| 5,268,930 | 12/1993 | Sendyk et al. | 375/13 |
| 5,297,166 | 3/1994 | Batruni | 375/14 |
| 5,311,546 | 5/1994 | Paik et al. | 375/14 |

FOREIGN PATENT DOCUMENTS

0467412 1/1992 European Pat. Off. ............ 375/14

Primary Examiner—Stephen Chin
Assistant Examiner—T. Ghebretinsae
Attorney, Agent, or Firm—Samuel R. Williamson

[57] ABSTRACT

An equalization technique for the compensation of degradation caused by multipath Rayleigh fading channels to the transmission of digitally modulated signals such as $\pi/4$ Differential Quadrature Phase Shift Keying (DQPSK) modulated signals. The technique is applicable to both linear and nonlinear transversal equalizers. Based on the Method of Projection onto Convex Sets (POCS), the technique is realized in an iterative form. The convergence speed of equalization depends on the magnitude of a look-back parameter, and is comparable to the speed of recursive least square based equalizers. The computational complexity of the technique also is variable and is adaptable to the convergence speed requirements. For achieving convergence speeds as recursive least square techniques, the computational load required of the presented equalization is of the order of the load required of the recursive least square techniques, but its program implementation is exceedingly simpler. At the same time the code size, memory and power consumption requirements are lower.

22 Claims, 8 Drawing Sheets

FIG. 1
DIGITAL CELLULAR PHONE

| PROPERTY → ALGORITHM | COMPUTATIONAL COMPLEXITY | | MEMORY SIZE (LMS+) | | | CODE SIZE (LMS+) |
|---|---|---|---|---|---|---|
| | ADD/MULTIPLY | DIVIDE | MATRIX | VECTOR | | |
| LMS/NLMS | $2l + 1$ | $O(1)$ | 0 | 0 | | 0 |
| FRLS | $20N + 5$ | 3 | $\sim (N \times N)/2$ HERMIT | N | | $\sim \times 10$ |
| RLS | $2.5^2 + 4.5N$ | 2 | $\sim (N \times N)/2$ HERMIT | N | | $\sim \times 10$ |
| SRRLS | $1.5^2 + 6.5N$ | N | $\sim (N \times N)/2$ HERMIT | N | | $\sim \times 10$ |
| RAP | $2N \times$ # OF CYCLES $\times$ # OF EQUATIONS | $O(1)$ | 0 | # OF EQUATIONS | | 0 |
| POCS | $2N \times B \times$ # OF EQUATIONS | $O(1)$ | 0 | LOOK-BACK | | 0 |

EQUALIZATION TECHNIQUE FOR COMPENSATING FOR DEGRADATION TO THE TRANSMISSION OF DIGITALLY MODULATED SIGNALS

BACKGROUND OF THE INVENTION

1. Technical Field

This invention relates to equalization systems for use in digital communications and more specifically to an equalization system for compensating for undesirable degradations that occur to signals in communication channels.

2. Description of the Prior Art

Digital communication systems which employ digitally modulated signals are increasingly being used in wireless and cellular applications. While propagating through a communication channel, these digitally modulated signals incur degradations in the form of intersymbol interference, fading and noise. These undesirable degradations on the signal are generally compensated for through use of equalization provided by equalizers in receivers employed in the digital communication systems.

The operation of conventional equalizers is well known and described, for example, by S. U. Quereshi in an article entitled *Adaptive Equalization*, Proceedings of the IEEE, Vol. 73, pages 1349–1387, September 1985. Two types of equalizer structures are most often used, transversal filters and Viterbi structures. Transversal filters consist of tap delay lines through which the received digitally modulated signals are shifted and the output of every tap is multiplied by a different coefficient. The output of the transversal filter based equalizer is the summation of all of the outputs from the taps multiplied by the coefficients. A part of transversal equalizers is a coefficient adaptation process which adjusts the coefficients such that the output of the equalizer is a signal without intersymbol interference degradation.

Viterbi equalizers are fundamentally different from transversal equalizers. Viterbi equalizers detect the sequence of the received signal for obtaining the maximum likelihood estimate of the sequence of the transmitted signal. The trellis, which is used for Viterbi equalization, represents all possible sequences of the transmitted signal. In operation, the Viterbi equalizer identifies a path through the trellis, this path representing the most likely sequence of the transmitted signal.

The properties of radio propagation through multipath fading channels, and the limitations of receiver technology impose a number of requirements on equalizers which attempt to compensate for degradations that occur to digitally modulated signals while in these channels. Traditional equalization structures and coefficient adaptation methods have disadvantages. By way of illustrative example, a numeration of the most often used equalizers and some particular disadvantages of these equalizers is provided. Linear transversal equalizer structures have noise inversion problems. Decision feedback equalizer (DFE) structures with least mean squares (LMS) coefficient adaptation have slow coefficient convergence. DFE structures with recursive least squares (RLS) adaptation have high computational complexity and are numerically unstable. Lattice equalizer structures are computationally complex. Tap-jamming based transversal equalizers are characterized by memory inefficient block processing and high computational complexity. And maximum likelihood sequence estimation (MLSE) equalization techniques have a high computational complexity and a need to have good channel estimates. Also, these MLSE equalization techniques are sensitive to phase errors and have high memory requirements.

As apparent from the above, various techniques of equalization are known and have been used to date. These techniques are, however, either computationally complex or are limited in performance in some manner. It is therefore desirable that equalization techniques not only be capable of satisfactory performance but also be computationally simple. With an increased need for portable communication terminals, such as digital cellular telephones and cordless telephones, there is an increased need for this type of equalization technique. The availability of such a technique advantageously would allow, for example, power consumption to be conserved in these portable communication terminals which, while in their normal operating environment, receive all operating power from a battery usually contained within the terminal.

SUMMARY OF THE INVENTION

An improved technique for equalizing a received signal which is degraded by propagating through a multipath fading communication channel is provided, in accordance with the invention. In the operation of the technique, a separate equation is generated from the combination of each sample in the received signal, a desired signal value (or estimated signal value) and a measured signal estimation error. Each equation is examined for generating an increasingly improved approximation of a common value solution for use in determining the values of coefficients employed in an equalizer.

In one aspect of the invention, equalization of the degraded received signal is achieved in the equalizer through use of a look-back depth parameter. This selectable parameter determines the number of previously examined equations which are reexamined prior to examining an equation generated using the most recently received signal sample. Since only those equations that must be reexamined are stored in memory, the memory requirements for this technique are significantly less than those required by other equalization techniques.

In another aspect of the invention, flexibility in selecting and adaptively varying the value of the look-back depth parameter is provided. Through use of the measured signal estimation error, the technique variably adapts the value of the look-back depth parameter. Optimal equalizer complexity and performance in compensating for channel degradation effects are thus achieved through the selection of an optimum value for the look-back depth parameter. Being able to configure the equalizer in this manner results in significant savings in power consumption and memory requirements while being able to achieve the desired convergence speed for the selected application.

BRIEF DESCRIPTION OF THE DRAWING

This invention and its mode of operation will be more clearly understood from the following detailed description when read with the appended drawing in which.

DETAILED DESCRIPTION

Figure 1:
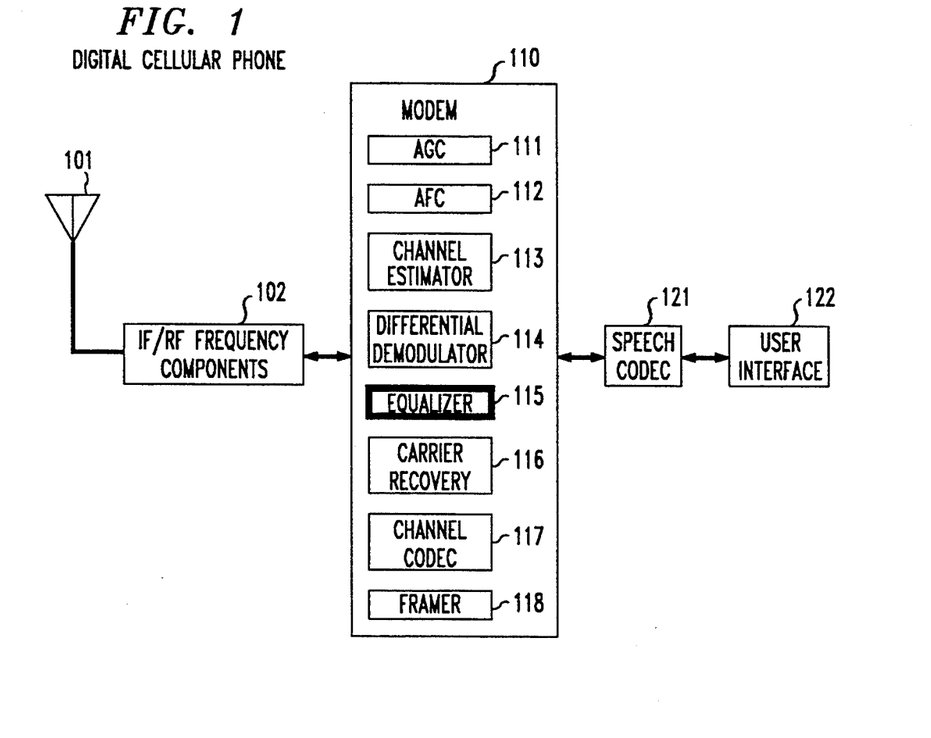
FIG. 1 is a block diagram representation of functions performed in a digital receiver such as a cellular telephone.

With reference to FIG. 1 there is shown a high level block diagram representation of functions performed, for example, in a digital cellular telephone terminal. The equalization technique of this invention may be readily employed in such a digital cellular telephone. A signal received over antenna 101 is received in an IF/RF components block 102. In this block 102, a conversion from radio frequencies to baseband frequencies of the received signals is performed. Also since this block contains a transmitter, which provides signals for transmission over the antenna, a conversion from baseband frequencies to radio frequencies is performed as well in this block 102.

Receive signals from the block 102 are coupled to a modem 110 in which a number of digital signal processing functions illustrated by blocks 111 through 118 are performed. Each of these processing functions are well known and found as parts of traditional modems.

Figure 7:
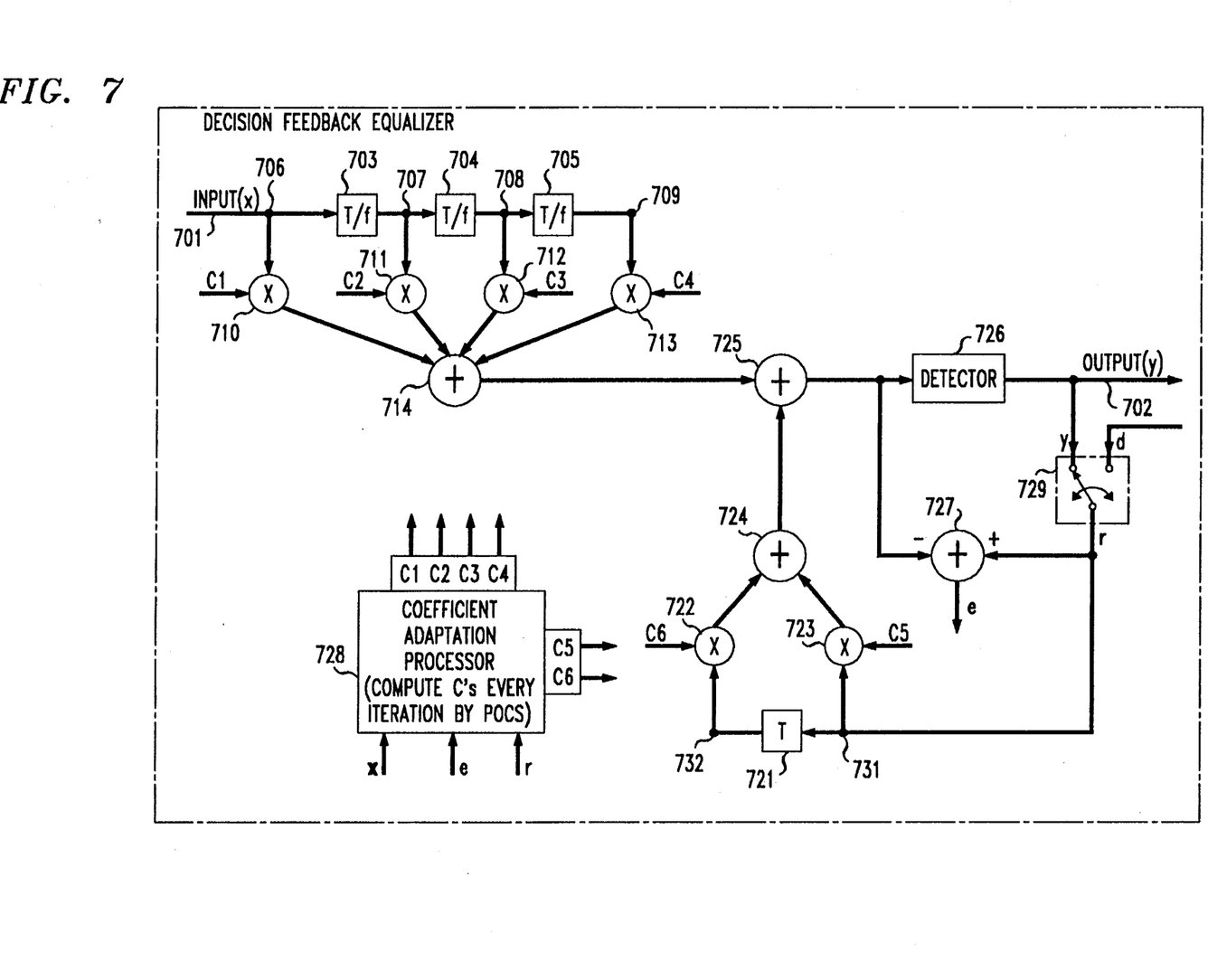
FIG. 7 is a fractionally spaced decision feedback equalizer.

One particular important function in the modem 110 is the equalizer 115, which performs compensation of channel degradations that occur during the transmission of digitally modulated signals. Although this equalizer function is known, improving its performance in terms of reducing its complexity, power consumption, code size (ROM size requirement) and storage memory size (RAM size requirements) is desirable and has been achieved in accordance with the present invention. An equalizer suitable for use as equalizer 115 is shown in FIG. 7 and described in detail later herein.

Connected to the modem 110 is a speech codec 121 that performs a conversion which changes the digitally encoded speech received from the modem 110 into an analog speech waveform and vice versa. Connected to the speech codec 121 is a user interface 122 which enables a user to control and use the cellular telephone terminal.

Figure 2:
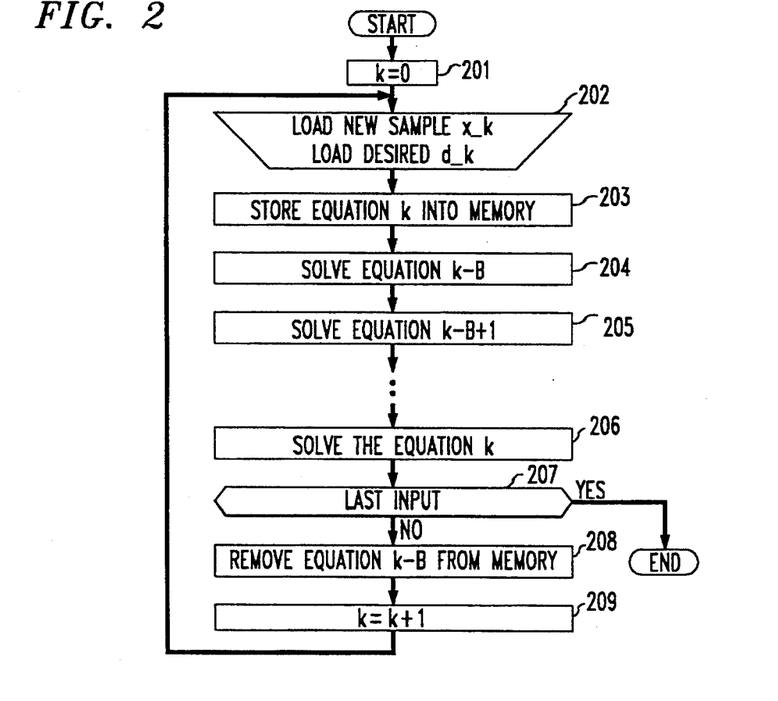
FIG. 2 is a flow-chart representation of the basic POCS equalization operation.

Referring next to FIG. 2, them is shown a simplified flow diagram illustrating the operation of equalizer 115 in providing equalization to a channel degraded receive signal, in accordance with the invention. Coefficient adaptation is achieved through a process which is based on the Method of Projection onto Convex Sets (POCS) realized iteratively using the least mean squares procedure. The process is initialized at step 201 where the initializing parameter, the value for the equation K in memory, is set to zero. From this step 201, the process advances to step 202 where a new sample along with a new desired signal, or a new computed estimate of the signal is entered and used for the subsequent processing steps. From step 202, the process advances to step 203 where the equation formed by previously entered values is put into memory. In steps 204, 205, 206, as well as in any additional intermediate steps (not illustrated), previously stored equations are recomputed with new estimates of coefficients. In decision 207 the process determines if all input samples have been used. If not, then the equation indexed with k-B is removed from memory in step 208, the value for the equation k is incremented by one in step |209, and the process is restarted at step 202. If in decision 207, it is determined that all inputs have been used the process is exited.

An equalization problem can be expressed by the following vector/matrix equation $$d = Xc + e, \qquad (1)$$

where d is the vector of desired symbols/estimated symbols (training mode/decision directed mode), X is the matrix of received symbols, c is the vector of equalizer coefficients, and e is the error vector. Equivalently this equation can be written as $$\begin{bmatrix} d_k \\ d_{k-1} \\ \vdots \\ \vdots \\ d_{k-L+1} \end{bmatrix} = \begin{bmatrix} x_k^H \\ x_{k-1}^H \\ \vdots \\ \vdots \\ x_{k-L+1}^H \end{bmatrix} \begin{bmatrix} c_{0,k} \\ \vdots \\ \vdots \\ c_{N-1,k} \end{bmatrix} + \begin{bmatrix} e_k \\ e_{k-1} \\ \vdots \\ \vdots \\ e_{k-L+1} \end{bmatrix} \qquad (2)$$

where $X_K^H$ is conjugated and transposed vector $x_k$. In the case of the linear transversal equalizer vector $x_k$ represents the set of symbols present in the transversal filter at time k. Parameter L denotes the processing size of the filter and N stands for the number of the taps in the filter. Any two adjacent vectors $x_k$ and $x_{k+1}$ in the equalization problem are obtained by shifting the data through the filter, feeding new data point and discarding the oldest data point. The equation (1) can be geometrically represented as a set of intersecting hyperplanes.

Figure 3:
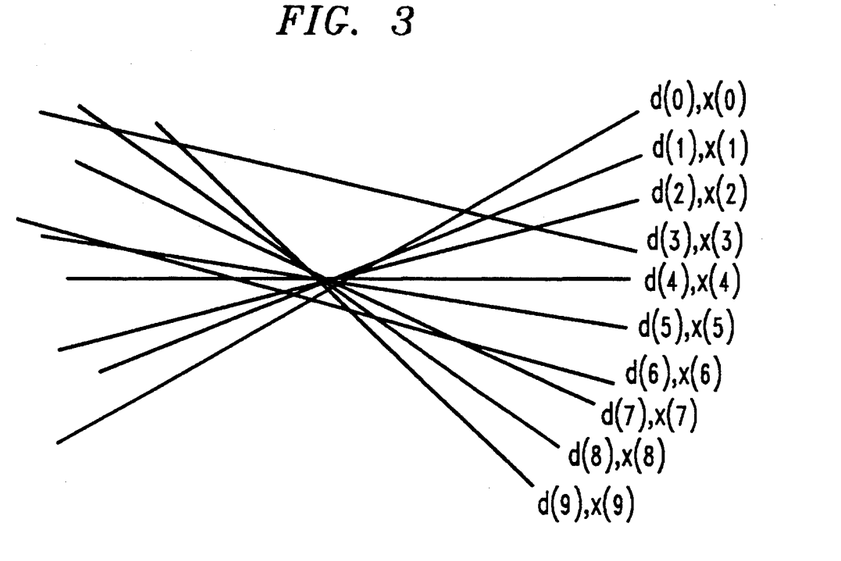
FIG. 3 is a Hyperplane representation of equalizer equations for the 2-dimensional case.

With reference to FIG. 3, there is shown a graphical illustration of intersecting hyperplanes for a two-dimensional case. This graphical illustration represents a set of ten equations for a simple two coefficient (tap) equalizer:

$$\begin{bmatrix} d_1 \\ d_2 \\ d_3 \\ d_4 \end{bmatrix} = \begin{bmatrix} x_{11} & x_{12} \\ x_{21} & x_{22} \\ x_{31} & x_{32} \\ x_{41} & x_{42} \end{bmatrix} \begin{bmatrix} c_1 \\ c_2 \end{bmatrix} + \begin{bmatrix} e_1 \\ e_2 \\ e_3 \\ e_4 \end{bmatrix} \qquad (3)$$

The task of equalization is to find c so as to minimize some error criterion. The least-square solution which minimizes $\|e\|$ is given by $$c = [X^H X]^{-1} X^T d. \qquad (4)$$

The inverse of the matrix $X^H X$ does not necessarily exist or it can be unstable because of the properties of the data. It is therefore desirable to find some other regularized inversion $c = X\dagger d$ which does exists and is stable at the same time. It is observed that the POCS based iterative procedure satisfies these requirements.

Each one of the set of ten equations shown in FIG. 3 is built from one desired sample value and two input signal values. Ideally all the equations should intersect in a single point, but due to distortion and noise that is not the case. The goal of any equalization method is to obtain a common solution to all the equations which is represented in the figure by a generally common intersection. A process of examining or solving the set of equations may be represented by a trajectory which starts at an initial signal estimate marked by 0, in FIG. 4, 5 and 6, and ends when all equations have been solved. Different equalization methods use different coefficient adaptation procedures and their solution trajectories differ.

Figure 4:
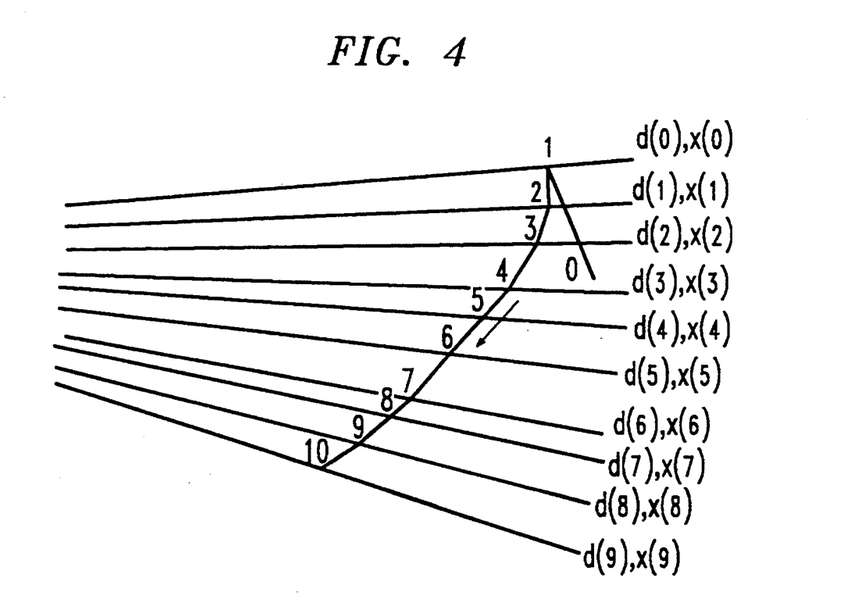
FIG. 4 is a illustration of the LMS based iterative solution of the set of equations.
Figure 5:
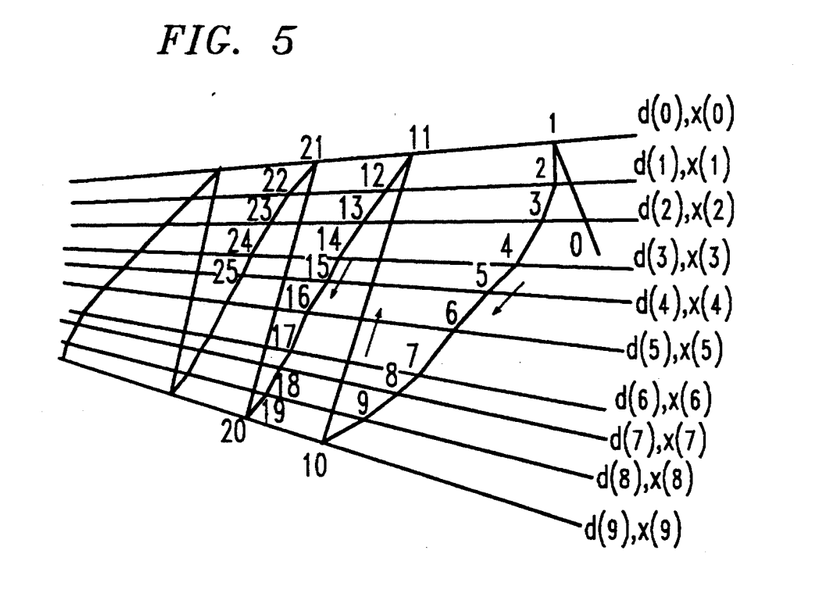
FIG. 5 is an illustration of the Doherty (RAP) based iterative solution of the set of equations.

With reference next to both FIGS. 4 and 5, there are shown solution trajectories for two known equalization techniques. In FIG. 4, a trajectory for LMS or RLS coefficient based adaptations is shown. Each equation in these FIGS. is represented by a single line.

A simple approximation to the stochastic gradient solution of the set of equations is given by a LMS adaptive expression $$c_{k+1} = c_k + \mu[d_k - c_k^H x_k] x_k, \quad k = 1, 2, \ldots, L \quad (5)$$

The major problem of this method is its slow convergence. In the LMS technique every data vector $x_k$ and the corresponding equation or hyperplane is used only once in arriving at the solution.

In a paper by J. F. Doherty et al., entitled *A fast method for Regularized Adaptive Filtering*, in Digital Signal Processing, Vol. No. 2, pp. 14–26, 1992, an iterative procedure based on the normalized LMS was investigated. Doherty proposed using the LMS adaptation repetitively on the same set of equations, in a block processing fashion which can be represented by $$c_{i+1} = c_i + \mu[d_j - c_i^H x_j] \frac{x_j}{\|x_j\|^2}, \quad (6)$$

when proper indexing is specified. Here $j = (\text{mod})i$, and the sequence in which indices change is specified by $(i,j)$ for $i = 1, \ldots, L \times I$ where I is the number of times that one equation is reused. The way in which the equations are reused is illustrated in FIG. 5. This FIG. thus shows an equalization technique which visits every equation line more than once. It is observed that every equation (line) is revisited for the next time only after all equations have been visited once. By way of comparison to the equalization technique shown in FIG. 4, a better solution to the set of equations is obtained through the equalization technique shown in FIG. 5. (The closer the last solution is to the intersection point, the better the overall solution).

Figure 6:
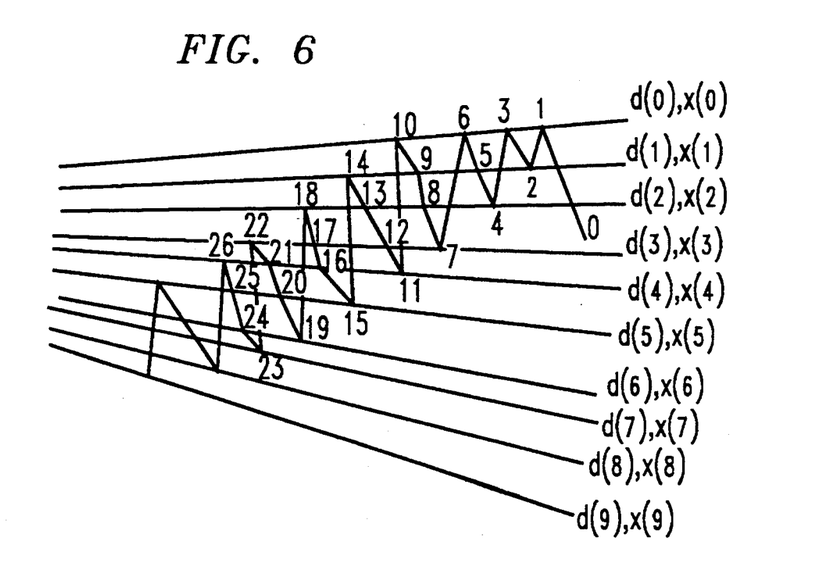
FIG. 6 is an illustration of the POCS based iterative solution of the set of equations.

Referring next to FIG. 6, there is shown a graphical illustration of an equalization technique which operates in an iterative routine and requires low computational complexity coefficient adaption, in accordance with the invention. The equalization technique specifies when and how many particular equations are reused in the process. The analytical expression for the POCS based iterative process is $$c_{i+1} = c_i + \mu[d_j - c_i^H x_j] \frac{x_j}{\|x_j\|^2} \quad (7)$$

$i = 0, 1, 2, \ldots, \text{MAX};$
and MAX is $$\text{MAX} = (B + 1)[(L - 1) - (B + 1)] + \sum_{k=0}^{B} k,$$

$$j = w + z, \quad w = \left[ \frac{i - \sum_{k=0}^{U} k}{U + 1} \right],$$

$$z = (w + 1)(U + 1) + \sum_{k=0}^{U} k - 1 - i,$$

$$U = \begin{cases} B & i \geq \sum_{k=0}^{B} k \\ B - 1 & \sum_{k=0}^{B} k > i \geq \sum_{k=0}^{B-1} k \\ B - 2 & \sum_{k=0}^{B-1} k > i \geq \sum_{k=0}^{B-2} k \\ \cdots & \cdots \end{cases} \quad (8)$$

In this process a parameter B is introduced which defines a look-back depth. More specifically, it specifies how many previous equations are revisited and used for the iterative coefficient computation prior to using a new equation (data point). The solution trajectories for this process are shown in the graphical illustration provided in FIG. 6. And this process may be performed by the routine described by the flow chart shown in FIG. 2. Stated differently, the look-back depth parameter B determines a subset of previously examined equations lines, a number M being reflective of the assigned value B for identifying M most recently examined equation lines in the subset.

The equalization technique disclosed herein is a recursive and adaptive improvement over the block processing technique described by Doherty et al., in Digital Signal Processing Vol. No. 2, pp. 14–26, 1992. Other relevant work addressing cyclical equalization has been reported by K. H. Mueller et at. in an article entitled *Cyclic Equalization—A new Rapidly Converging Equalization Technique for Synchronous Data Communication*, The Bell System Technical Journal, Vol. 534, pp. 369–406, February 1975.

In solving the equalization equation, in accordance with the invention, the POCS based technique effectively performs regularized inversion, and avoids the problem of least-square solutions related to inverting rank deficient and ill-conditioned matrices. D. C. Youla et al., in an article entitled *Image Restoration by the Method of Convex Projections Part 1—Theory*, IFFF Trans. Medical Imaging, Vol. MI, pp. 81–94 October 1982, shows that POCS-based equalization can be represented in a form of regularized iterative pseudo inversion.

This can be shown by the following $$c_l = H c_{l-1} + \hat{d} \quad (9)$$

where $$H = P_k P_{k-1} \ldots P_{k-LV+1},$$

$$\hat{d} = \sum_{j=e}^{(modL)(1-L)} P_{VL} P_{VL-1} P_{VL-2} \cdots \quad (10)$$

$$P_{(j+B)V+(V+1)}(P_{(j+B)V+(V)} \cdots P_{(j+B-1)V+(V)}x$$

$$(\cdots (P_{(j+1)V+(2)} \cdots P_{(j)V+(2)} + 1) \cdots) + 1) + 1) \mu \frac{x_j}{\|x_j\|^2} d_j$$

and $$P_k = I - \mu \frac{x_k x_k^H}{\|x_k\|^2}. \quad (11)$$

Here $V = B + 1$.

Further manipulation leads to the representation of these equations in a pseudo-inverse form as set forth in K. Tanabe in an article entitled *Projection Method for Solving a Singular System of Linear Equations and its Application* in Numer. Math., Vol 17, pp.203–214, 1971. This form is $$c_l = G_l d \quad (12)$$

with singular values $$\sigma_{gl} \approx \frac{1}{\sigma_x} \left[ 1 - \left( 1 - \frac{\mu}{N} \sigma_x^2 \right)^{l+1} \right].$$

The POCS process is regularized through the iteration index 1. Small singular values are inverted with the taper, zero singular values are inverted to zeros. The smaller the singular values, the more they are attenuated. Data structures do not influence convergence properties.

FIG. 7 is an equalizer operably in accordance with the principles of the present invention. The equalizer structure is of the decision feedback type. The object of the adaptation technique disclosed herein is to adapt coefficients so that an input digital signal (x) provided at the input of the equalizer on line 701 is compensated for channel degradations before being provided as an output digital signal (y) over an output line 702. With every time step the input signal propagates through taps 703, 704, 705 one at a time. Taps 703, 704, 705 delay the signal for a fractional amount of symbol time T, which is equal to T/f (By having T/f the equalizer becomes a fractionally spaced decision feedback equalizer). At every time instance signal samples present at nodes 706, 707, 708 and 709 are respectively multiplied at multipliers 710, 711, 712 and 713 with coefficient values C1, C2, C3 and C4, and summed in adder 714. Simultaneously, the signal at the output 702 (in the decision directed mode) or signal d (in the training mode) as chosen by switch 729 and denoted by r is multiplied by coefficient value C5 in multiplier 723 or propagates through the tap 721 and is multiplied with coefficient value C6 in multiplier 722. These two signals are then summed up in the summer 724. Outputs of the summers 7 14 and 724 are summed up in summer 725 once per signal sample period T. In detector 726, the signal is detected by being appropriately thresholded. The output of the detector provides the output signal, y.

The coefficients are computed in a coefficient adaptation processor block 728. This processor block 728 may be implemented through the use of a microcomputer containing ROM, RAM and through use of the proper coding. Such a microcomputer is know in the art and is readily available from semiconductor manufactures such as Signetics, Intel, AMD and AT&T.

The inputs to processor block 728 are a measured estimation error signal e which is obtained from the block 727; vector x generated by the set of x signals currently present at nodes 706, 707, 708, 709, 731 and 732; and the signal r. While operating in the training mode of equalization, signal r is equal to the known training signal d, which is provided as an input to the equalizer for a predetermined number of symbols. In the American Digital Cellular Communication System (IS-54), for example, the training period is 14 symbols long. While operating in the decision directed mode of equalization, signal r is equal to the estimated signal y at the output of the equalizer. In processor block 728, the coefficient values are computed as specified in the simplified flow diagram shown in FIG. 2 and as specified in greater detail using the POCS procedure defined in equation (7). After the coefficient values are computed, these values are used in multipliers 710, 711, 712, 713, 722 and 723. This procedure is repeated for each new input sample x appearing on line 701.

The differences between the RAP technique proposed by Doherty and the technique disclosed herein, in accordance with the invention, may be visualized simply by comparing FIGS. 5 and 6. The beneficial differences are numerous, however, and are set forth for highlighting the advantageous features of this improved equalization technique. First, the POCS technique does not require that all of the equations be revisited in every step of the iterative procedure. Second, since only a few previous equations have to be revisited by the POCS technique, it is not required that all equations be stored in memory. The number of equations that have to be stored in the memory for the POCS technique is determined by the look-back depth B. The significance of this operation is that the memory required for storing the equations that need to be reused is equal to L/B in the general case. In the particular case of American Digital Cellular IS-54, the number of equations that need to be stored for POCS procedure is approximately two times smaller than the memory needed for the RAP technique. Third, the POCS technique provides flexibility in choosing and adaptively varying the look-back depth parameter. The POCS technique can adapt the value of the look-back depth parameter based on the measurement of the system's signal estimation error and accomplish convergence in approximately the same time needed by the frame structure of the protocol. This assures that there are no computations wasted. In the particular case of the American Digital Cellular IS-54, the convergence with POCS can be accomplished in approximately 14 symbols used for the training mode of the equalizer.

Properties of the equalizer disclosed herein are:
  Rapid equalizer coefficient convergence (comparable to RLS convergence);
  Low computational complexity coefficient adaptation (comparable or linearly increased from LMS methods);
  Low power consumption in digital processing or ASIC implementations;
  Numerical stability for fixed-point implementations;
  Minimal program-code size (the same as LMS methods);
  Minimal RAM-memory size; and Controllability of the equalizer computational complexity.

Figure 8:
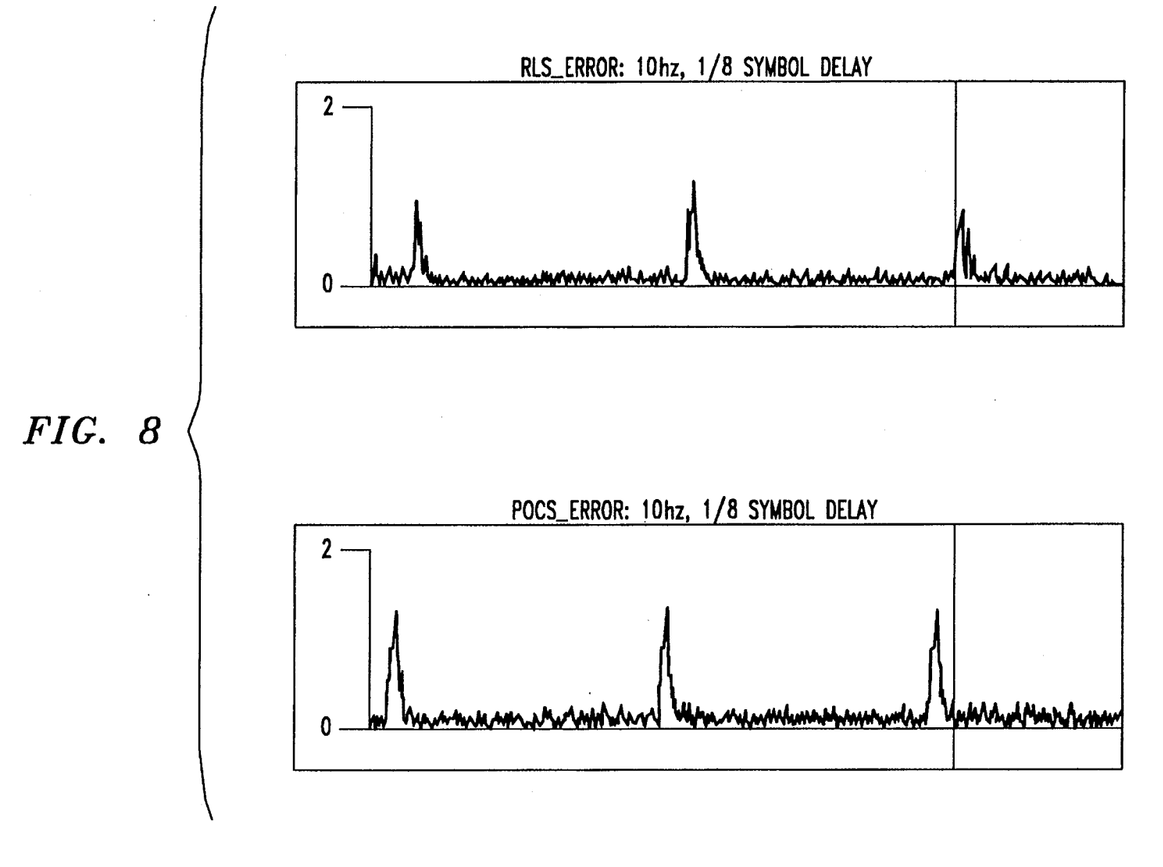
FIGS. 8, 9 and 10 show performance comparisons in terms of convergence speed between various equalization techniques.
Figure 9:
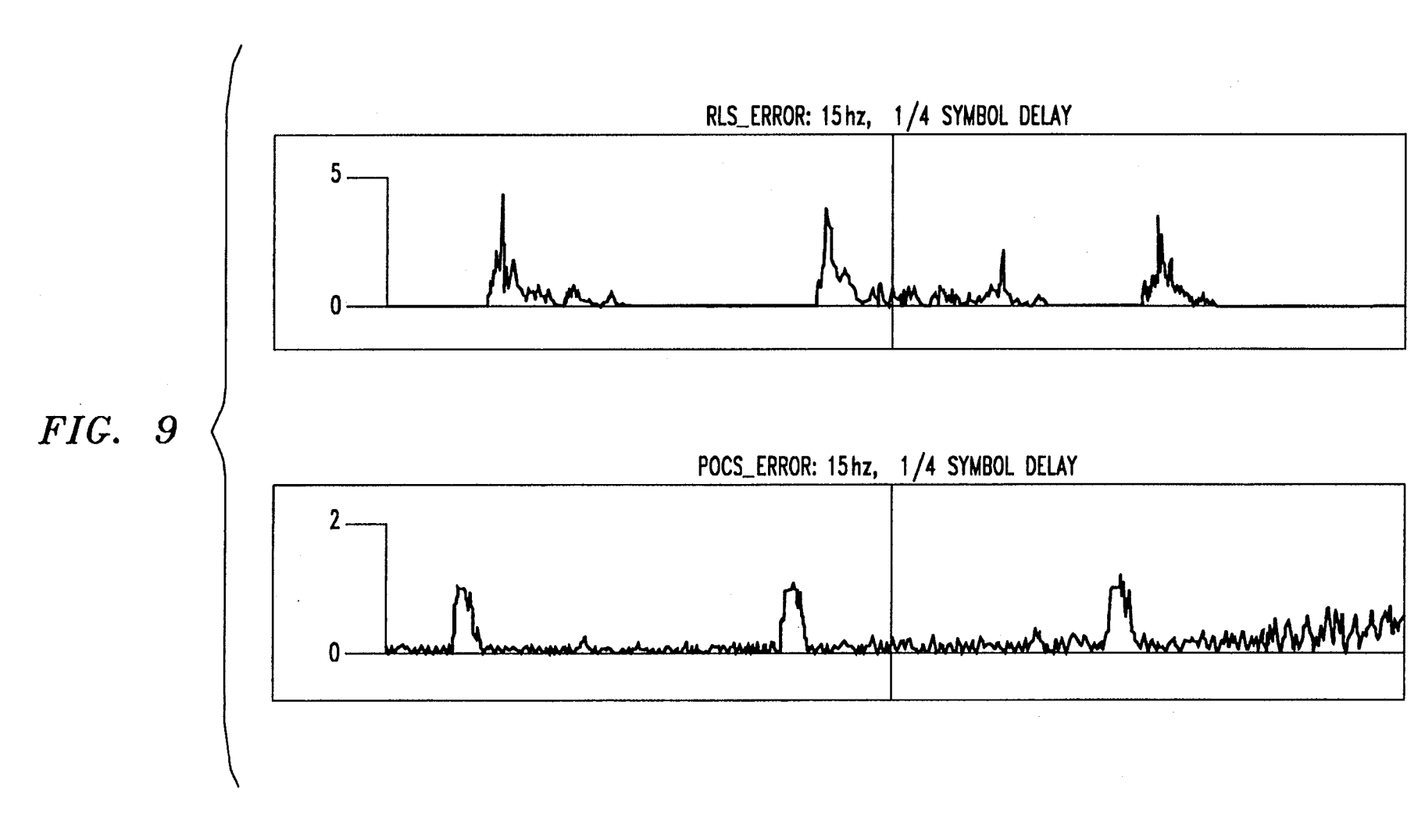
Figure 10:
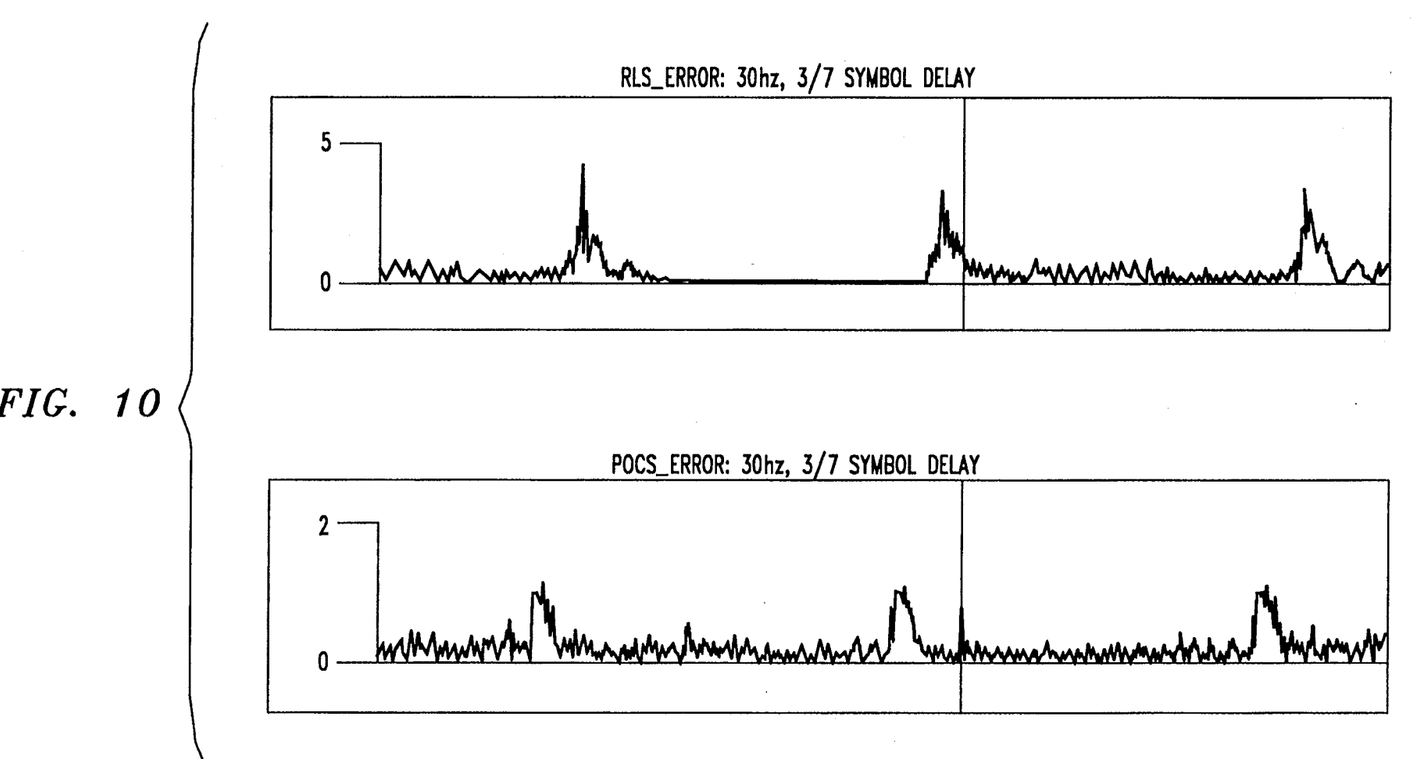

One application of the technique is in the American Digital Cellular Communication System (IS-54) in which the performance has been verified. The results of the performance when operating in this system are shown in FIGS. 8, 9 and 10. The modulation used in this system is $\pi/4$ DQPSK, bit rate is 48.6 kb/s, and symbol rate is 24.3 kbaud. The multipath Rayleigh fading channel has been used where allowed Doppler spread was up to 80 Hz, the separation between multipath components was up to one symbol time, and equal to 41 microseconds. Automatic gain control and when necessary baseband carrier recovery were used in the receiver.

FIG. 8 presents a comparative performance in terms of convergence speed between an equalizer based on the RLS coefficient adaptation technique and the equalizer based on the POCS coefficient adaptation technique disclosed herein. The value presented at the abscissa is the time and the values presented at the ordinate are the magnitude of the error signal e. The maximal error values are different for the RLS and POCS techniques illustrated in this figure. This figure has been obtained by simulating the communications channel and relevant modem blocks. In this simulation the Doppler spread of the channel is equal to 10 Hz and the multipath characteristics are such that the second path is $\frac{1}{8}$ symbol away from the first multipath component and it has the same average power. It should be observed that the duration of the peaks, during which the equalizers based on the RLS and POCS are in the 14 symbol long training mode (where the coefficients are converging), are about the same. This verifies that POCS based equalization achieves the desired convergence speed.

FIG. 9 presents a comparison between the convergence speed of an equalizer based on the RLS coefficient adaptation technique and the convergence speed of the equalizer based on the POCS coefficient adaptation technique disclosed herein. The value presented at the abscissa is the time and the values presented at the ordinate are the magnitude of the error signal e. The figure has been obtained by simulating the communications channel and relevant modem blocks. In this simulation the Doppler spread of the channel is equal to 15 Hz and the multipath characteristics are such that the second path is $\frac{1}{4}$ symbol away from the first multipath component and it has the same average power. It can be seen that the duration of the peaks during which equalizers are converging are about the same. This verifies that POCS based equalization achieves the desired convergence speed under described channel conditions. It can also be seen that POCS converges as fast as RLS, and that POCS does not have an occurrence of extremely low values of the errors as shown in this Figure. This appears to suggests that the POCS technique is more stable.

FIG. 10 presents a comparison between the convergence speed of an equalizer based on the RLS coefficient adaptation technique and the convergence speed of the equalizer based on the POCS coefficient adaptation technique disclosed herein. The value presented at the abscissa is the time and the values presented at the ordinate are the magnitude of the error signal e. Note that the maximal error values are different for RLS and POCS techniques in this figure. The figure has been obtained by simulating the communications channel and relevant modem blocks. In this simulation the Doppler spread of the channel is equal to 30 Hz and the multipath characteristics are such that the second path is 3/7 symbol away from the first multipath component and it has the same average power. It is shown that the duration of the peaks during which the equalizers are converging are about the same. This verifies that POCS based equalization achieves the desired convergence speed under described channel conditions.

Figure 11:
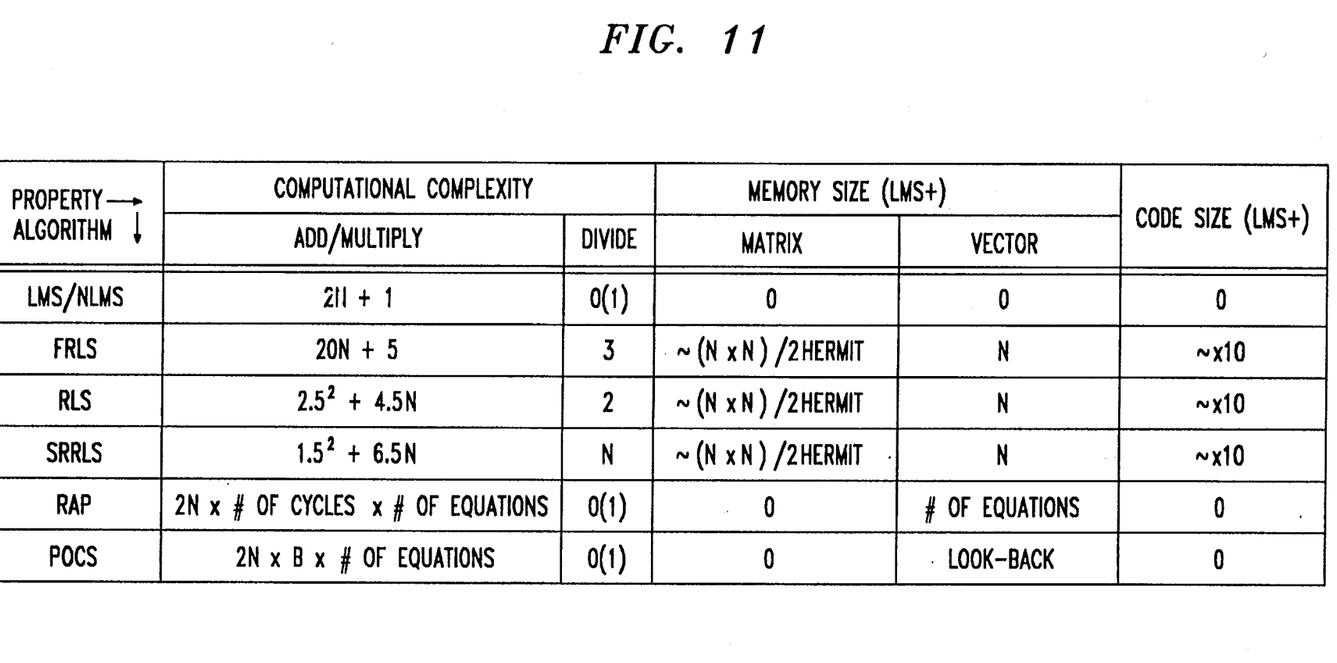
FIG. 11 is a table which summarizes a comparison between the POCS technique and other equalization techniques.

A summary of the comparison between POCS technique and other equalization techniques is provided in the table shown in FIG. 11. In this table, the advantages of the POCS in terms of computational simplicity, power savings and memory requirements are shown. The table presents approximate computational complexity, RAM memory requirements and code size (ROM memory) requirements. LMS processing requirements are taken as a point of reference for RAM memory size and code size. Values in parentheses refer to normalized versions of RAP and POCS (versions presents herein).

Various modifications of this invention are contemplated and may obviously be resorted to by those skilled in the art without departing from the spirit and scope of the invention as hereinafter defined by the appended claims.

What is claimed is:

1. A method of equalizing a channel degraded received signal to compensate for channel degradations in the received signal, the method comprising the steps of:
   sampling the received signal for obtaining a plurality of received signal samples;
   generating a set of equation lines from the plurality of received signal samples, the equation lines being indicative of a common value solution used in determining values for coefficients for use in an equalizer;
   iteratively examining each one in the set of equation lines, the examining step examining a new equation line only after each one in a subset of previously examined equation lines in the set is reexamined; and
   iteratively computing coefficients for achieving adaptive convergence of the coefficients in the equalizer with the received signal.

2. The method of claim 1 wherein the iteratively examining step further includes the step of limiting the equation lines being reexamined in the subset to a number M of equation lines in the subset, the number M identifying M most recently examined equation lines in the subset.

3. The method of claim 2 wherein the generating step further includes the step of providing a training signal, the training signal providing a plurality of training signal samples for combining with the received signal samples.

4. The method of claim 3 further comprising the step of adjusting the received signal samples to be equivalent to the training signal samples, the adjusting step compensating for degradations in the received signal.

5. The method of claim 2 wherein the generating step further includes the step of providing an error signal having a magnitude indicative of a convergence speed required for providing a specific level of adaptive convergence for the coefficients in compensating for degradations in the received signal.

6. The method of claim 5 further comprising the step of varying the number M in response to the change in magnitude of the error signal.

7. The method of claim 6 wherein the number varying step causes the number M to increase in magnitude when the convergence speed required for achieving the specific level of adaptive convergence of the coefficients is high and decrease in magnitude when the convergence speed required for achieving the specific level of adaptive convergence of the coefficients is low.

8. An equalizer circuit for performing equalization on a channel degraded received signal to compensate for channel degradations in the received signal, the circuit comprising:

means for sampling the received signal for obtaining a plurality of received signal samples for use in the equalizer circuit;

means for generating a set of equation lines from the plurality of received signal samples, the equation lines being indicative of a common value solution used in determining values for coefficients for use in the equalizer circuit;

means for iteratively examining each one in the set of equation lines, the examining means examining a new equation line only after each one in a subset of previously examined equation lines in the set is reexamined; and means responsive to the examining means for iteratively computing coefficients for achieving adaptive convergence of the coefficients in the equalizer circuit with the received signal.

9. The circuit of claim 8 wherein the examining means further includes means for limiting the equation lines being reexamined in the subset to a number M of equation lines in the subset, the number M identifying M most recently examined equation lines in the subset.

10. The circuit of claim 9 wherein the generating means further includes means for generating a training signal, the training signal providing a plurality of training signal samples for combining with the received signal samples.

11. The circuit of claim 10 further comprising adjusting means responsive to the coefficient computing means for adjusting the received signal samples in the receive signal to be equivalent to the training signal samples being provided in the training signal, the adjusting means compensating for degradations in the received signal.

12. The circuit of claim 9 wherein the generating means further comprises means for providing an error signal having a magnitude indicative of a convergence speed required for providing a specific level of adaptive convergence for the coefficients in compensating for degradations in the received signal.

13. The circuit of claim 12 further comprising means for varying the number M in response to the change in magnitude of the error signal.

14. The circuit of claim 13 wherein the means for varying the number M causes the number M to increase in magnitude when the convergence speed required for achieving the specific level of adaptive convergence of the coefficients is high and decrease in magnitude when the convergence speed required for achieving the specific level of adaptive convergence of the coefficients is low.

15. A method of equalizing a channel degraded received signal to compensate for degradations in the received signal, the method comprising the steps of:

sampling the received signal for obtaining a plurality of received signal samples;

generating a set of equation lines from the plurality of received signal samples, the equation lines being indicative of a common value solution used in determining values for coefficients for use in an equalizer;

iteratively examining each one in the set of equation lines, the examining step examining a new equation line only after each one in a subset of previously examined equation lines in the set is reexamined;

selecting an initial value for a look-back depth parameter B for use in determining the subset of previously examined equation lines, the selected value for the parameter B being indicative of a level sufficient for achieving a selected level of adaptive convergence of the coefficients with the received signal; and iteratively computing coefficients for achieving adaptive convergence of the coefficients in the equalizer with the received signal.

16. The method of claim 15 further comprising the steps of:

providing an error signal indicative of the level of adaptive convergence of the coefficients with the received signal; and selecting a subsequent value for the parameter B in response to a change in value of the error signal, the change in error signal being indicative of a change in the degradations in the received signal and the subsequently selected value for the parameter B being indicative of a level sufficient for achieving the selected level of adaptive convergence of the coefficients with the received signal.

17. The method of claim 16 wherein the value for the parameter B increases in magnitude when the level of adaptive convergence of the coefficients for compensating for degradations in the signal is high and decreases in magnitude when the level of adaptive convergence of the coefficients for compensating for degradations in the signal is low.

18. The method of claim 17 wherein the iteratively examining step includes the step of limiting the equation lines being reexamined in the subset to a number M of equation lines in the subset, the number M being reflective of the assigned value B for identifying M most recently examined equation lines in the subset.

19. An equalizer circuit for performing equalization on a channel degraded received signal to compensate for channel degradations in the received signal, the circuit comprising:

means for sampling the received signal for obtaining a plurality of received signal samples;

means for generating a set of equation lines from the plurality of received signal samples, the equation lines being indicative of a common value solution used in determining values for coefficients for use in the equalizer circuit;

means for iteratively examining each one in the set of equation lines, the examining means examining a new equation line only after each one in a subset of previously examined equation lines in the set is reexamined;

means for selecting an initial value for a look-back depth parameter B for use in determining the subset of previously examined equation lines, the selected value for the parameter B being indicative of a level sufficient for achieving a selected level of adaptive convergence of the coefficients with the received signal; and means for iteratively computing coefficients for achieving adaptive convergence of the coefficients in the equalizer circuit with the received signal.

20. The circuit of claim 19 further comprising:

means for providing an error signal indicative of the level of adaptive convergence of the coefficients with the received signal; and means for selecting a subsequent value for the parameter B in response to a change in value of the error signal, the subsequently selected value for the parameter B being indicative of a level sufficient for achieving the selected level of adaptive convergence of the coefficients with the received signal.

21. The circuit of claim 20 wherein the value for the parameter B increases in magnitude when the level of adaptive convergence of the coefficients for compensating for degradations in the signal is high and decreases in magnitude when the level of adaptive convergence of the coefficients for compensating for degradations in the signal is low.

22. The circuit of claim 21 wherein the iteratively examining means includes means for limiting the equation lines being reexamined in the subset to a number M of equation lines in the subset, the number M being reflective of the assigned value B for identifying M most recently examined equation lines in the subset.

* * * * *